(No Model.) 6 Sheets—Sheet 1.
J. R. SEVERANCE.
KNOTTING MECHANISM FOR GRAIN BINDERS.

No. 452,457. Patented May 19, 1891.

Witnesses:
J. Watson Sims
C. G. Crannell

Inventor:
James R. Severance,
By Geo. B. Selden,
Atty (No Model.) 6 Sheets—Sheet 2.
J. R. SEVERANCE.
KNOTTING MECHANISM FOR GRAIN BINDERS.

No. 452,457. Patented May 19, 1891.

Witnesses:
J. Watson Sims
C. G. Crannell.

Inventor:
James R. Severance,
By Geo. B. Selden,
Atty.

(No Model.) 6 Sheets—Sheet 3.
J. R. SEVERANCE.
KNOTTING MECHANISM FOR GRAIN BINDERS.

No. 452,457. Patented May 19, 1891.

(No Model.) 6 Sheets—Sheet 4.
J. R. SEVERANCE.
KNOTTING MECHANISM FOR GRAIN BINDERS.

No. 452,457. Patented May 19, 1891.

Witnesses:
J. Watson Sims
C. G. Crannell

Inventor:
James R. Severance,
By Geo. B. Selden,
Atty.

(No Model.) 6 Sheets—Sheet 5.
J. R. SEVERANCE.
KNOTTING MECHANISM FOR GRAIN BINDERS.
No. 452,457. Patented May 19, 1891.
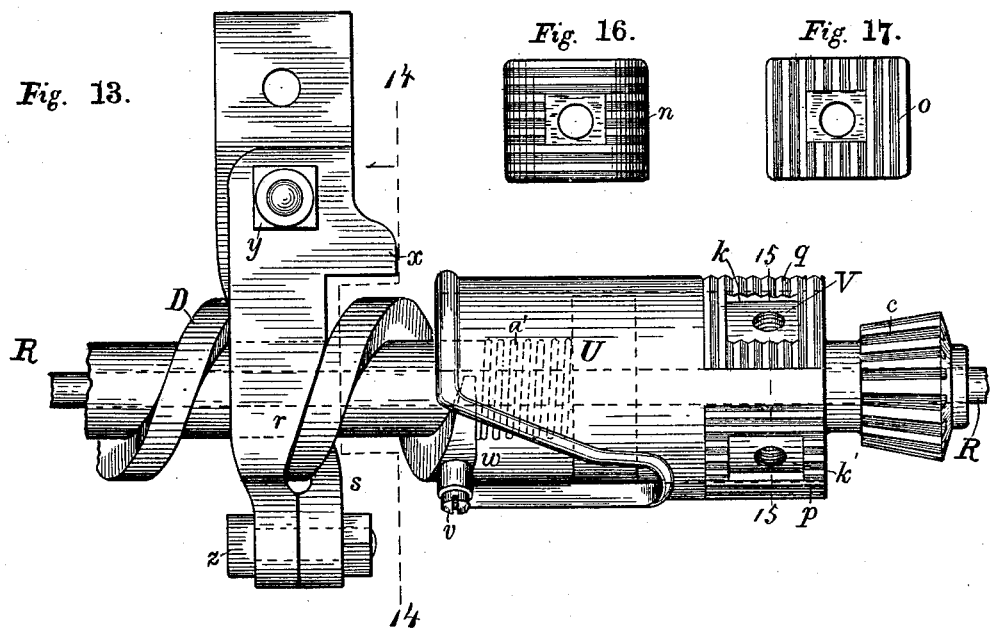
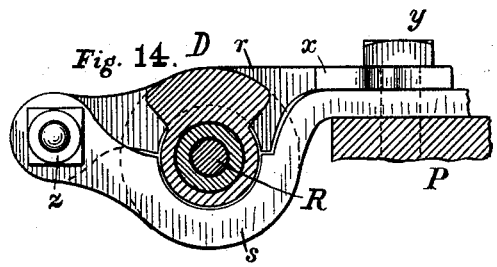
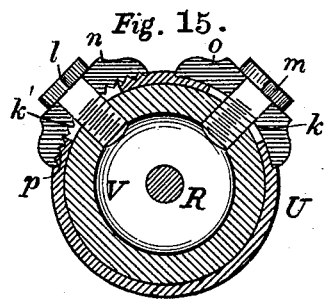
Witnesses:
J. Watson Sims
C. G. Cramwell
Inventor:
James R. Severance,
By Geo. B. Selden,
Atty.
THE NORRIS PETERS CO., PHOTO-LITHO., WASHINGTON, D. C.

(No Model.) 6 Sheets—Sheet 6.
J. R. SEVERANCE.
KNOTTING MECHANISM FOR GRAIN BINDERS.

No. 452,457. Patented May 19, 1891.

UNITED STATES PATENT OFFICE.

JAMES R. SEVERANCE, OF POUGHKEEPSIE, NEW YORK.

KNOTTING MECHANISM FOR GRAIN-BINDERS.

SPECIFICATION forming part of Letters Patent No. 452,457, dated May 19, 1891.

Application filed August 22, 1890. Serial No. 362,794. (No model.)

*To all whom it may concern:*

Be it known that I, JAMES R. SEVERANCE, a citizen of the United States, residing at Poughkeepsie, in the county of Dutchess, in the State of New York, have invented certain Improvements in Knotting Mechanism for Grain-Binders, of which the following is a specification, reference being had to the accompanying drawings.

My present invention relates to certain improvements on that type of knotting mechanism for grain-binders which has been shown in my previous Patents Nos. 237,135 and 382,773, and in my pending application, Serial No. 362,010.

My present improvements are fully described and illustrated in the following specification and the accompanying drawings, and the novel features thereof specified in the claims annexed to the said specification.

Figure 1:
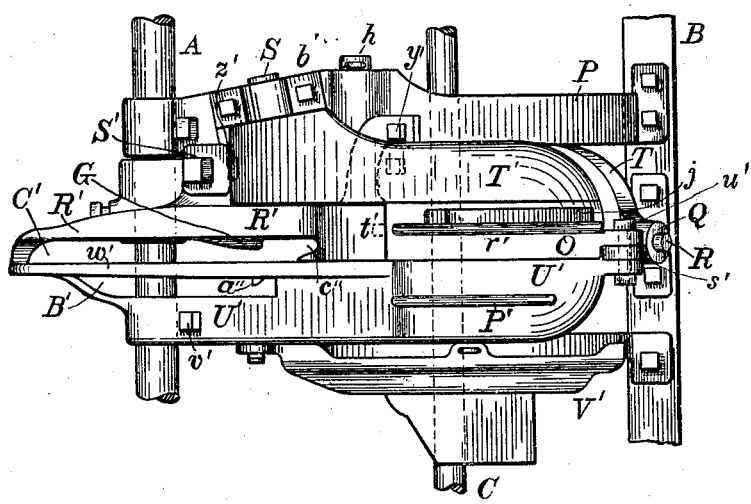
Figure 2:
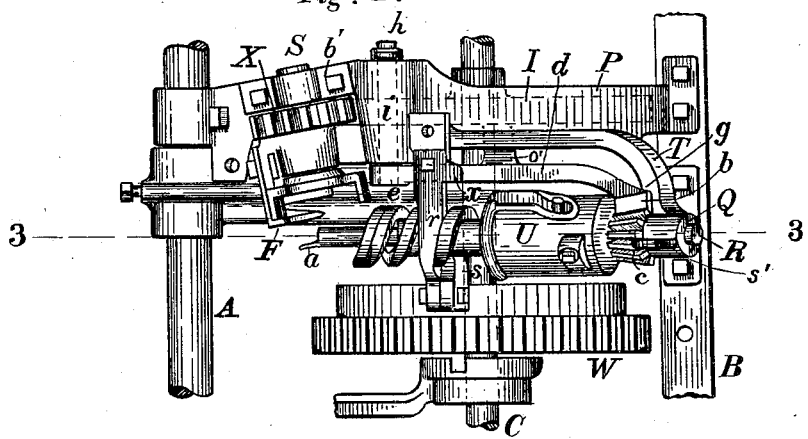
Figure 3:
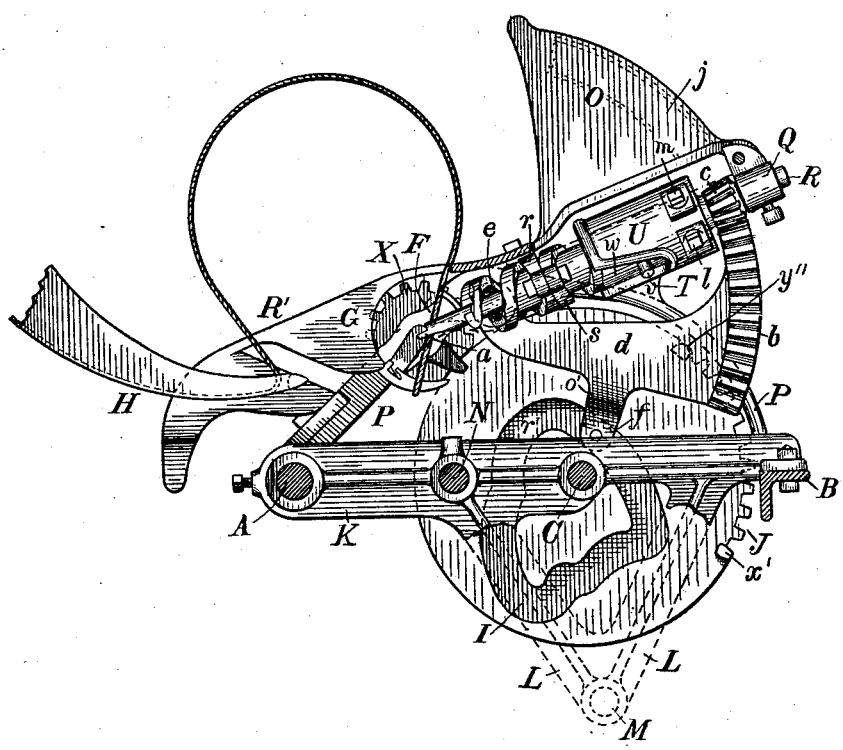
Figure 6:
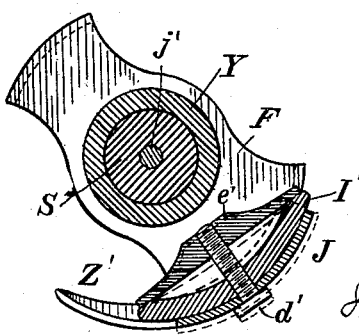
Figure 4:
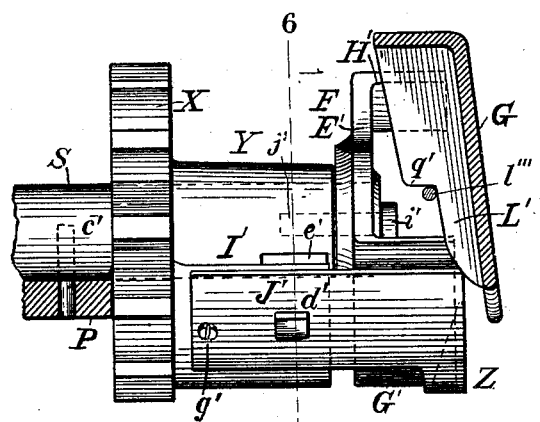
Figure 5:
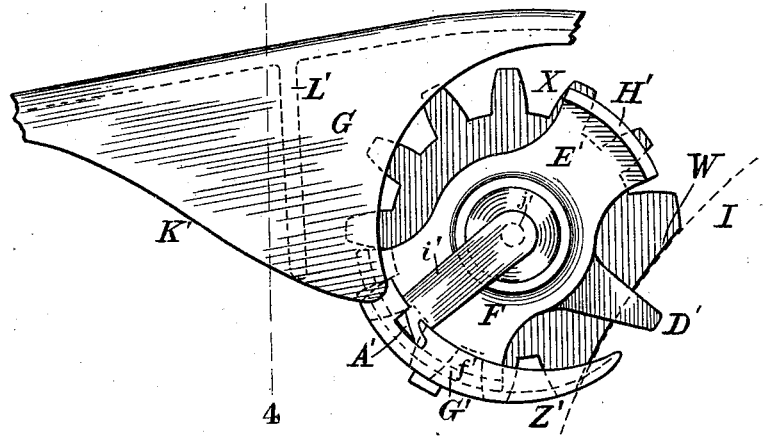
Figure 12:
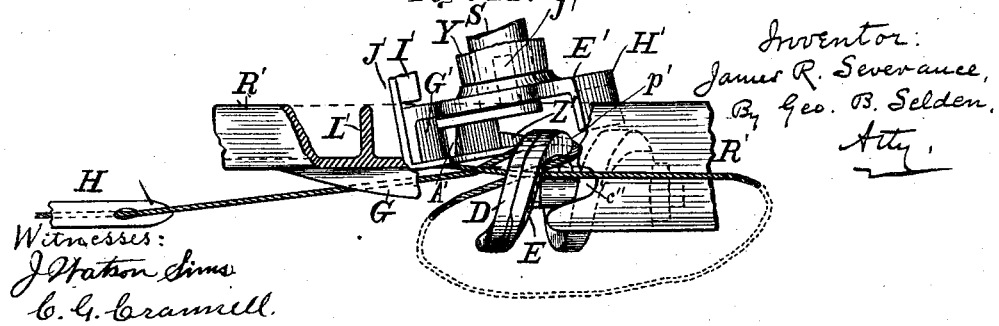
Figure 18:
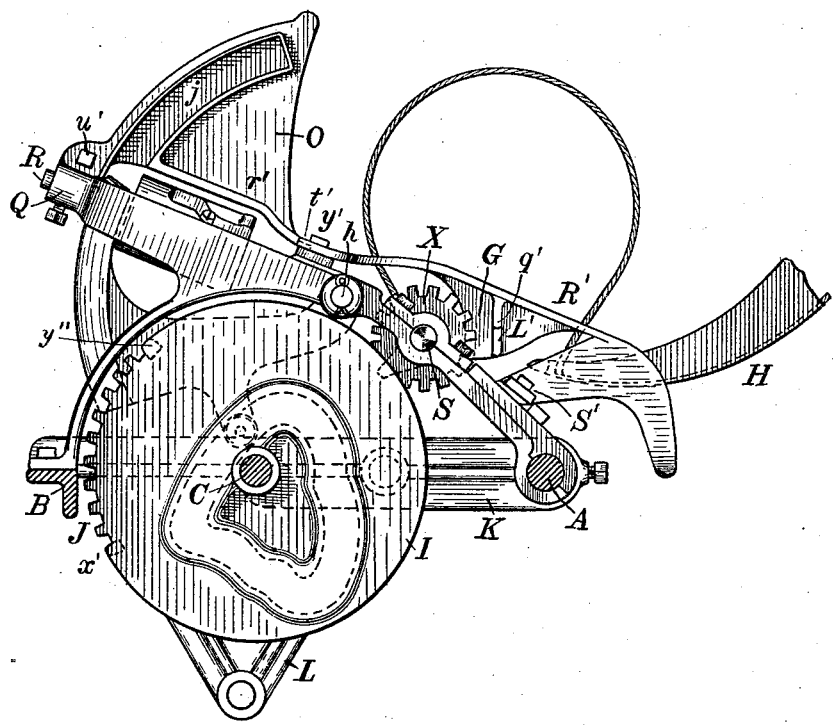

In the accompanying drawings representing my present improvements in knotting mechanisms for grain-binders, Figure 1 is a plan view. Fig. 2 is a plan view, the protecting-casing being removed. Fig. 3 is a transverse section on the line 3 3, Fig. 2, showing the knotter-spirals, their driving-cam and the cord-holder in elevation. Fig. 4 is a section through the stationary cord-guide on the line 4 4, Fig. 5, showing the cord-holder in side elevation. Fig. 5 is an elevation of the cord-holder and the stationary cord-guide. Fig. 6 is a transverse section through the cord-holder on the line 6 6, Fig. 4, showing the parts to the right hand of said line. Figs. 7 to 12, inclusive, are diagrams representing the successive steps in the formation of the knot. Fig. 13 is a plan view representing the cam-shell, a portion of the knotter-spirals, and the divided nut or guide for the latter. Fig. 14 is a section on the line 14 14, Fig. 13, showing the parts to the left hand of said line. Fig. 15 is a section on the line 15 15, Fig. 13. Figs. 16 and 17 show the inner surfaces of the washers used to adjust the cam-shell. Fig. 18 is a rear elevation of the knotting mechanism.

The construction of the knotting mechanism shown in the present application is substantially like that represented in my pending application, Serial No. 362,010, in its general features, the principal points of novelty herein consisting in the employment of a stationary cord-guide, a modification of the cord-holder and of the mechanism by which the movements of the knotter-spirals are timed, and in certain novel features hereinafter described by which the construction and adjustment of the knotting mechanism is facilitated.

In the accompanying drawings, A and B represent the parallel rods of the binder-frame; C, the knotter driving-shaft; D and E, the knotter-spirals; F, the cord-holder, and G the stationary cord-guide.

Figure 7:
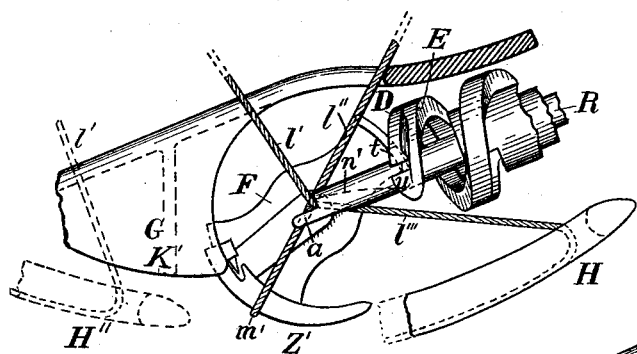

H, Figs. 3 and 7, represents the point of the binder-arm, which carries the cord around the gavel and presents it to the spirals.

The shaft C is connected with the operative mechanism of a harvester and binder in any suitable manner, so that it receives therefrom a rotary movement of one revolution for each bundle. The knotter-spirals and the cord-holder are actuated from the shaft C by the cam I and the segmental gear J, Fig. 3. The shaft C may also be used to operate the binder-arm, such a construction being shown in my pending application, Serial No. 344,111. A clutch on the gearing which drives the shaft C is arranged to be thrown into action by a trip-lever operated by the accumulation of grain in the grain-receptacle.

The rods A and B are supported in any convenient way on the frame of the harvester, preferably so as to permit the adjustment of the binding mechanism lengthwise of the grain. The rods are connected together at their ends by suitable cross-bars, and immediately under the knotter by the cross-bar or frame K, Fig. 3, which carries an arm or arms L, which support a journal for the binder driving-shaft M. The cross-bar K also carries the pivot N, on which the reciprocating gate or side compressor swings, as described in my pending applications, Serial Nos. 217,390, 220,509, and 344,111. The side compressor travels in the slot B', Fig. 1, and assists in the compression of the bundle. The binder or needle arm travels in the slot C', Fig. 1.

The grain is brought to the knotter by the binding-arm from the left hand, as represented in Fig. 3, the knotter frame or casing being provided with a projecting horn O, which prevents the grain from being forced beyond the knotter, and also assists in the compression of the gavel. From the cord-holder F the cord passes around the bundle to the eye of the binder-arm, as indicated in Fig. 3, at the time the knot is tied.

The construction and operation of the knotter-spirals are substantially like those shown in my pending application, Serial No. 362,010, and the knot formed by them is of the same type. The knotter-spirals are mounted on an axis or stem R, which is fastened in a boss Q on the outer end of the cross bar or frame of the knotter P, which extends across between the rods A and B, and affords support for the various operative parts of the knotter mechanism. As indicated in Fig. 3, the knotter-spirals are preferably inclined downward toward the incoming grain. The cord-holder F is supported on the stud S, inserted in the cross-bar P, which is bent or curved upward, so as to sustain the parts in the proper relative positions.

T is a bent arm on the cross-bar P, which carries the boss Q. The stem R extends all the way through the knotter-spirals, terminating at its inner end in a guide $a$, which assists in the formation of the knot.

The cam-shell U is caused to revolve first in one direction and then in the other by the cam I, the vibrating toothed segment $b$, and the pinion $c$. The toothed segment $b$ is supported on an arm $d$, pivoted at $e$, Figs. 2 and 3, to the cross-bar P. The arm $d$ is provided with a stud or roller $f$, Fig. 3, which engages with the cam-groove in the cam I, and as the latter revolves with the shaft C causes the segment to vibrate and to impart a reciprocating rotary movement to the pinion $c$ and the cam-shell U. The back of the curved toothed segment $b$ bears against a shoulder $g$, Fig. 2, on the arm T, by which it is held in mesh with the pinion $c$ and is prevented from springing away therefrom. An offset extension $o'$, Figs. 2 and 3, on the arm $d$ carries the roller $f$. The segment vibrates on a pivot formed by the stud $h$, passing through a boss $i$ on the cross-bar P. The stud is provided with a washer and split pin at its outer end. When the segment $b$ is elevated, it passes within a curved channel $j$, Figs. 3 and 18, on the horn O, which protects it from becoming entangled with the straw.

The pinion $c$ revolves on the stem R. At its inner end it is provided with an enlarged hub V, Figs. 13 and 15, (preferably made hollow,) to which the cam-shell is adjustably secured by means of the screws $l$ and $m$ and the washers $n$ and $o$. Openings $k\ k'$ are made through the cam-shell of sufficient dimensions to permit the adjustment of the cam-shell U on the hub V both lengthwise and by turning it about its axis, the screws $l$ and $m$ passing through these openings into threaded holes in the hub. The outer surface of the cam-shell immediately around the openings $k\ k'$ is roughened or corrugated, as represented at $p$ and $q$, Fig. 13, the ribs or corrugations $p$ extending lengthwise of the cam-shell, and the ribs $q$ circumferentially, as shown. The inner surfaces of the washers $n$ and $o$ are provided with similar corrugations, so that as the washers fit the screw closely, whenever it is desired to adjust the cam-shell on the hub V this may be accomplished by slacking the screws until the washers are free of the corrugations, in which condition the cam-shell can be moved lengthwise or turned axially and then firmly secured in the altered position by tightening the screws and causing the corrugations on the washers to engage with those on the cam-shell.

The cam-shell operates the knotter-spirals in the manner described in my said previous application, and in particular in application, Serial No. 362,010. As the cam-shell revolves, the spirals screw themselves forward toward the cord-holder through the divided nut $r s$, and at the extremity of their forward movement the jaws $t\ u$ at the free ends of the spirals are opened, so as to receive the cord by the roller or stud $v$ coming in contact with a suitable stop $x$ on the knotter-frame or on the upper part $r$ of the divided nut, so that the spiral D is arrested in its movement, while the other spiral continues its movement for a short distance, so as to separate the jaws at the extremities of the spirals. The open condition of the jaws is represented in Fig. 7. The stud $v$ travels entirely out of the slot $w$ in the cam-shell and comes in contact with the stop $x$. The divided nut $r\ s$ is made of a form adapted to fit the thread and sustain the body of the spiral D, being attached to the cross-bar P by the screw or screws $y$, and connected together at their opposite ends by the bolt or screw $z$.

The construction and operation of the cam-shell U are the same as described in my previous patent, No. 382,773. It is provided with two longitudinal tracks, in which the rollers or knurls attached to the spirals travel, and with a spring $a'$, Fig. 13, by which devices the operations of opening and closing the jaws are performed at the proper times, as described in said last-mentioned patent.

The cord-holder is represented in Figs. 3, 4, 5, 6, and 12. The cord-holder is supported on the cross-bar P by the stud S, which is clamped in place on the bar by the cap $b'$, Figs. 1 and 2, secured to the bar by bolts or screws. The stud S is prevented from turning in its support by a pin $c'$, Fig. 4, inserted in the bar and entering a hole in the stud.

X is a segmental pinion, which meshes with the teeth J, Fig. 3, on the cam-disk I, so that the cord-holder makes a single revolution for each bundle bound. The segmental pinion is provided with the delay-surface W, Fig. 5, which bears against the smooth portion of the periphery of the cam-disk.

The pinion X is provided with a starting-tooth D', Fig. 5, which is moved by the tooth $x'$, Fig. 3, on the side of the cam-disk. A tooth $y''$, at the opposite end of the teeth J, may be employed to prevent the binder from being turned backward. The segmental pinion has attached to it the hub Y, which carries the clamping-plate Z, horn Z', and the knife A', Fig. 5.

The stud S passes through the hub Y and supports at its inner end a transverse bar E', which carries the segmental curved flanges G' and H', constituting the cord-clamping jaw and clearer, respectively. The clamping-plate Z is attached to the hub Y and revolves around the clamping-jaw G' and the clearer H'. The pinion X has a curved flange I' cast on it, and the body J' of the clamping-plate is secured to this flange by the screw $d'$ and spring $e'$. The spring is arranged across the hollow or concave inner surface of the flange I', and the screw $d'$ enters a threaded hole in the spring, as indicated in Fig. 6. Provision is thus made for allowing the clamping-plate to yield away from the clamping-jaw, when the cord is gripped between them. The ends of the spring are fitted into notches or recesses in the edges of the flange I'. The spring bends outward slightly, as indicated by the dotted lines in Fig. 6, when the cord is gripped between the clamping-plate and the jaw. The amount of pressure on the cord is regulated by the screw $d'$. The edge of the clamping-plate is bent over the edge of the clamping-jaw, as represented at $f'$, Fig. 5. The knife A' is carried by an arm $i'$, provided with a stem $j'$, fitting a hole in the stud S. The knife fits a notch in the inwardly-projecting flange $f'$ of the clamping-plate, as represented in Fig. 5. The knife revolves with the clamping-plate and severs the cord against the edge of the clamping-jaw. During their revolution the clamping-plate and knife pass one on each side of the clearer H', and the clearer serves to remove any bits of cord or other refuse from between the clamping-plate and the knife.

Figure 10:
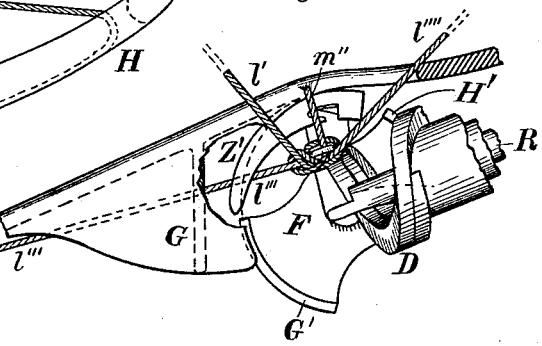
Figure 8:
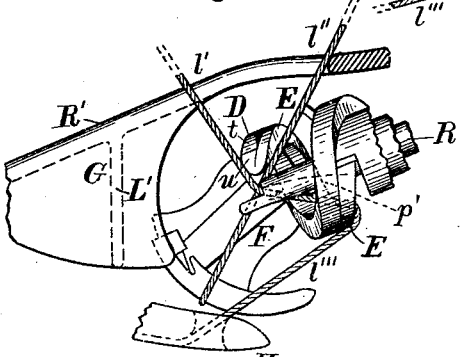
Figure 11:
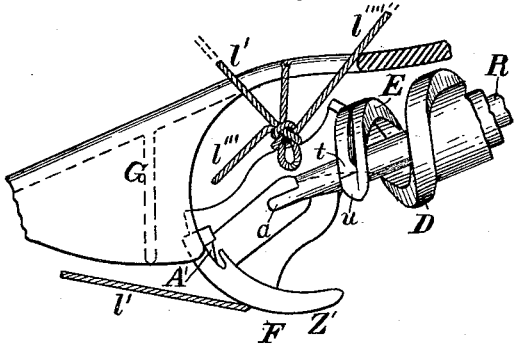
Figure 9:
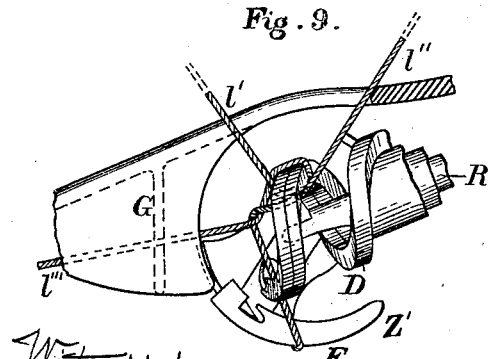

At the commencement of the operation of making the knot the cord $l'$, Fig. 7, is brought in toward the spirals by the binder-arm, as indicated at H''. At the same time the portion of the cord $l''$ adjacent to the end which is held by the cord-holder at $m'$ is carried along the lower edge K' of the stationary cord-guide G by the grain passing over the knotter until the cord occupies the position represented by the full lines in Fig. 7. The cord at $l'''$ has now been placed by the binding-arm where the free ends of the spirals will pass over it as they move forward. The lower side of the end of the stem R is recessed, as indicated by the dotted lines $n'$, Fig. 7, and the cord is received in this recess, the projecting lip $a$ serving to guide it to the proper position. As the spirals travel forward the binder-arm moves backward, so that the next position of the parts is represented in Fig. 8, where the free ends of the spirals have passed over the end of the stem and between the cords $l'$ and $l''$. The motion of the spirals is now arrested while the roller $f$ is passing through the concentric portion $r'$, Fig. 3, of the cam I, so that no movement is imparted to the vibrating segment $b$. While the spirals remain stationary in this position the binding-arm continues its backward movement and the cord $l'''$ slips along the curved surface $p'$, Fig. 8, of the rear side of the spiral E, so that this portion of the cord moves toward the cord-holder, and as the binder-arm continues to travel backward it comes behind the stationary cord-guide G or between it and the cord-holder. This operation will be understood more clearly from an examination of Fig. 12, from which it will be seen that the strain on the cord maintained by the backward movement of the binder-arm causes the cord to slide along the inclined surface $p'$ of the spiral, thus virtually changing its direction and bringing it nearer the cord-holder. The further backward movement of the binder-arm slides the cord up along the inside of the cord-guide and brings it successively into the positions represented in Figs. 9 and 10, in which the cord comes above the stationary clamping-jaw G' and in position to be engaged by the horn Z' and to be acted on by the clamping-plate and the knife. It will be understood that that portion of the cord next the eye of the binding-arm as it comes into the knotter passes in front of the cord-guide G or on the side of it away from the cord-holder, while as the binder-arm moves backward this portion of the cord passes inside the cord-guide G or between it and the knotter, and this difference or change in the direction in the cord is produced by the sliding of the cord along the inclined surface of the spiral under the strain maintained on it as the binder-arm moves backward. The cord-guide G is provided on the side next the knotter with a rib L', Fig. 4, which rib has a projection at $q'$, which prevents the cord from being drawn above it. The cord is thus guided and held within the path of the point Z' of the clamping-plate. The construction herein shown dispenses with the long spiral horn on the clamping-plate shown in my said application, Serial No. 362,010. It will be understood that in order to accomplish this result of placing the cord behind the cord-guide as the binder-arm withdraws it is not necessary that the forward movement of the spiral should be arrested; but it is preferable to do so, as the shifting movement of the cord is thereby better timed relatively to the other operations. The result could be effected by slowing the movement of the spiral. After the spirals have been arrested in the position approximately represented by Fig. 9, while the cord is placed behind the cord-guide, they then move forward into the position represented in Fig. 9, the jaws are opened, and the cord near the holder is carried into the jaws by the motion of the holder, which now commences to revolve. The jaws now close on the cord; the cord-holder releases the end of the cord; the spirals begin to retract, pulling the end through the loop, as represented in Fig. 10, in which the point Z' of the clamping-plate is shown as just passing over cord l''', extending to the binder-arm; and m'', Fig. 10, shows the cut end of the cord, and l' l'''' the cord extending around the bundle. In Fig. 11 the formed knot is shown as stripped from the ends of the knotter-spirals, the end l''' having been just severed by the knife A', which has completed its revolution and returned to its position of rest. The cord l' now extends away to the binder-arm, ready for the repetition of the operations of forming the knot, when another gavel has accumulated in the receptacle.

The cord-guide G projects downward from any suitable part of the knotter-casing in the proper relation with the cord-holder, the knotter-spiral, and the path of the binder-arm. In the accompanying drawings it is shown as attached to or forming part of a curved guard R', Figs. 1 and 18, which is attached at one end of the frame P by the lug and screw S' and at the other end by a lug, through which passes the screw y', which also serves to secure the divided nut. The edge of the casing R' next the path of the binding-arm is straight, as seen from above, except as the cord-guide G preferably projects a short distance.

T', Fig. 1, is a removable cover, which may be hinged to a lug at z', so that it may be readily turned up to afford access to the cord-holder.

The horn O and guard j are carried by a plate r', which is secured at one end by a bolt u' to the lug s' on the boss Q, and at the other end is provided with a tongue t', which fits a recess in the end of the plate R'.

On the side of the plane of the path of the binder-arm opposite the horn O is placed a corresponding horn P', Fig. 1, which is carried by the knotter-casing U', secured at one end to the lug s' by the bolt u', and at the other end to the rod A by a clamp and screw v'. This portion of the casing is given a suitable form adapted to protect the parts underneath it. The bar w', which extends along the path C' of the binder-arm, forms a part of the casing U', being elevated to the same level as the plate R'. A supplementary casing V', Fig. 1, covers the driving-gear W' and the starting and stopping mechanism, which may be of any preferred type—such, for instance, as that shown in my pending application No. 344,111.

A lug a'', Fig. 1, on the bar w' limits the inward movement of the side compressor. A notch c'', Fig. 1, in the plate R' serves to guide the cord. g', Fig. 4, is a screw inserted in the curved plate I', through a smooth hole in the body J' of the clamping-plate to secure it in proper position without preventing its yielding outward to grip the cord.

I claim—

1. The combination, with the knotter-spirals and the hub V, of the cam-shell U, having opening k and a roughened surface q, and the washer o, having a corresponding surface and secured to the hub by the screw m, whereby the cam-shell may be adjusted lengthwise of the spirals, substantially as described.

2. The combination, with the knotter-spirals and the hub V, of the cam-shell U, having openings k k' and roughened surfaces p q, and the washers n o, having correspondingly roughened surfaces and secured to the hub by the screws l m, whereby the cam-shell may be adjusted both lengthwise and around the axis, substantially as described.

3. The combination, with the knotter-spirals, of the divided nut r s, fitting the spirals and attached to the knotter-frame on one side and connected together on the opposite side, substantially as described.

4. The combination, with the knotter-spirals provided with stud v, of the cam-shell U and the divided nut r s, one portion of which forms the stop x, substantially as described.

5. The combination, with the revolving cord-holder F, provided with horn Z', of the stationary cord-guide G, located on the same side of the binder-slot with the cord-holder, having rib or projection L', projecting across the plane of the path of the point of the horn and adapted to guide the cord into position to be engaged by the horn on its next succeeding revolution, substantially as described.

6. The combination, with the revolving cord-holder F, provided with horn Z', of the stationary cord-guide G, located on the same side of the binder-slot with the cord-holder, having rib or projection L', provided with notch q', substantially as described.

7. The combination, in a knotting mechanism, of a vibrating binder-arm, a suitable cord-holder, the knotter-casing U', supporting the stationary cord-guide G, located on the same side of the binder-slot with the cord-holder, and suitable knot-forming mechanism having an inclined surface, as p', leading away from the path of the binder-arm and along which the cord is drawn by the return movement of the binder-arm, whereby the cord is guided away from the binder-slot and placed on the side of the cord-guide away from the path of the binder-arm and in position to be seized by the cord-holder, substantially as described.

JAMES R. SEVERANCE.

Witnesses:
GEO. B. SELDEN,
C. G. CRANNELL.